(12) United States Patent
Günther et al.

(10) Patent No.: US 8,855,867 B2
(45) Date of Patent: Oct. 7, 2014

(54) VEHICLE SENSOR NODE

(75) Inventors: Stefan Günther, Frankfurt (DE);
Alexander Kolbe, Gross-Zimmern (DE);
Bernard Schmid, Friedberg (DE);
Otmar Simon, Pohlheim/Holzheim (DE);
Ulrich Stählin, Eschborn (DE)

(73) Assignee: Continental Teves AG & Co., oHG (DE)

( * ) Notice: Subject to any disclaimer, the term of this patent is extended or adjusted under 35 U.S.C. 154(b) by 257 days.

(21) Appl. No.: 13/576,197

(22) PCT Filed: Jan. 20, 2011

(86) PCT No.: PCT/EP2011/050774
§ 371 (c)(1),
(2), (4) Date: Jul. 31, 2012

(87) PCT Pub. No.: WO2011/098333
PCT Pub. Date: Aug. 18, 2011

(65) Prior Publication Data
US 2012/0303221 A1    Nov. 29, 2012

(30) Foreign Application Priority Data

Feb. 11, 2010 (DE) .......................... 10 2010 001 827
Dec. 22, 2010 (DE) .......................... 10 2010 063 984

(51) Int. Cl.
*E05F 15/00*    (2006.01)
*G05D 1/00*    (2006.01)
*G06F 7/00*    (2006.01)
*B60R 16/02*    (2006.01)

(52) U.S. Cl.
CPC ..................................... *B60R 16/02* (2013.01)
USPC .................. 701/45; 701/1; 701/36; 701/29.1

(58) Field of Classification Search
USPC ............................................ 701/1, 29.1–34.4
See application file for complete search history.

(56) References Cited

FOREIGN PATENT DOCUMENTS

DE    102 38 936 A1    3/2004
EP    1 386 802 A1    2/2004

OTHER PUBLICATIONS

International Search Report for PCT Application No. PCT/EP2011/050774 mailed May 11, 2011.

*Primary Examiner* — Bhavesh V Amin
(74) *Attorney, Agent, or Firm* — RatnerPrestia

(57) ABSTRACT

The invention relates to a sensor system including a plurality of sensor elements which are designed so that the elements detect at least partially different primary measured values and utilize at least partially different measurement principles, further including a signal processing apparatus, an interface apparatus and a plurality of functional apparatuses. The sensor elements are connected to the signal processing apparatus, which is designed so that it includes at least one of the following signal processing functions each for at least one of the sensor elements and/or the output signals thereof, an error handling, a filtering, a calculation and/or provision of a derived measured value. At least one measured value is derived from at least one primary measured value of one or more sensor elements, and all functional apparatuses are connected to the signal processing apparatus via the interface apparatus and the signal processing apparatus provides the signal processing functions.

14 Claims, 2 Drawing Sheets

VEHICLE SENSOR NODE

CROSS REFERENCE TO RELATED APPLICATIONS

This application is the U.S. National Phase Application of PCT/EP2011/050774, filed Jan. 20, 2011, which claims priority to German Patent Application Nos. 10 2010 001 827.9, filed Feb. 11, 2010 and 10 2010 063 984.2, filed Dec. 22, 2010, the contents of such applications being incorporated by reference herein.

FIELD OF THE INVENTION

The invention relates to a sensor comprising a number of sensor elements which are constructed in such a manner that they detect at least partially different primary measured variables and utilize at least partially different measuring principles, furthermore comprising a signal processing facility, an interface facility and a number of functional facilities, wherein the sensor elements are connected to the signal processing facility which is designed in such a manner that it comprises at least in each case one of the following signal processing functions for at least one of the sensor elements and/or its output signals.

BACKGROUND OF THE INVENTION

In the present-day vehicle architectures known from the prior art, sensors or sensor elements, respectively, are primarily allocated to functions or functional facilities. However, sensor signals can also be used by secondary functions by being forwarded either via interfaces or gateways which is mainly the case with safety-related primary functions, or by being directly accessible. An example of such a sensor system according to the prior art is illustrated by means of FIG. 2.

BRIEF DESCRIPTION

The invention proposes a sensor system which has an efficient structure, particularly with regard to the expenditure on development for such a sensor system and/or which offers improved fault tolerance and/or higher accuracy.

According to the invention, this is achieved by the sensor system comprising a number of sensor elements which are constructed in such a manner that they detect at least partially different primary measured variables and utilize at least partially different measuring principles, furthermore comprising a signal processing facility, an interface facility and a number of functional facilities, wherein the sensor elements are connected to the signal processing facility which is designed in such a manner that it comprises at least in each case one of the following signal processing functions for at least one of the sensor elements and/or its output signals, a fault management function, a filtering function, a calculation and/or provision of a derived measured variable, wherein at least one measured variable is derived from at least one primary measured variable of one or more sensor elements, and in that all functional facilities are connected to the signal processing facility via the interface facility and the signal processing facility provides the signal processing functions to the functional facilities.

The sensor system is preferably constructed as a part of a motor vehicle control system and at least one of the functional facilities is constructed as driving dynamics control function and/or motor vehicle safety function and/or motor vehicle passenger comfort function, wherein especially this at least one function is designed at least partially as a program.

The signal processing functions of the signal processing facility are preferably provided to the functional facilities bundled and/or in a defined common manner.

The term "connected" is preferably understood to be a hardware- and/or software-related connection, that is to say, in particular, a communication of programs or program sections via defined interfaces.

The sensor system preferably comprises sensor elements having at least three, particularly at least five different primary measured variables and/or at least three sensor elements, particularly at least five sensor elements which are based on different measurement principles or utilize different measurement principles, respectively.

The signal processing facility is preferably designed in such a manner that it comprises at least the three following signal processing functions, at least one fault management function which is designed as fail-safe function or fail-silent function, at least one filtering function and at least one calculation of a derived measured variable.

The sensor system is suitably designed in such a manner that the sensor elements and the facilities, that is to say at least the signal processing facility and particularly additionally the interface facility and the functional facility are integrated on a circuit board and/or in a jointly housed electronic component, that is to say, for example, in the electronic control unit of a motor vehicle control system.

All sensor elements of this sensor system are preferably connected jointly and/or in each case to the signal processing facility. In this context, in particular, none of the sensor elements is connected directly to one or more functional facilities and/or communicates directly with one or more functional facilities.

It is preferred that the signal processing facility is constructed in such a manner that it additionally exhibits an information quality evaluation function which, in particular, provides an information item about the reliability and/or accuracy and/or availability of one or more or each individual one of the derived and/or primary measured variable/s.

The information item about the accuracy is preferably understood to be an attribute for a first or a defined further measured value, this first measured value being present at least partially redundantly. To this end, the sensor system has two or more, particularly different measuring paths for providing this measured value, each measuring path comprising at least one sensor element and at least one signal processing function. To each of these measuring paths a measuring accuracy is allocated in a particularly preferred manner, which is defined via modeling and/or test measurements and/or a specification. The measuring accuracy allocated to the first measured value by the information quality evaluation function is in this context obtained from the measuring accuracies of the two or more measuring paths which provide this first measured value at least partially redundantly, the measuring accuracy of this first measured value in this context corresponding in a particularly preferred manner to the best/greatest measuring accuracy of one measuring path from the set of measuring accuracies of the currently available measuring paths for this first measured value. The term measuring accuracy is suitably understood to be a measuring precision or, respectively, a (relatively small) measuring deviation or measuring error.

The information item about the reliability is preferably understood to be an attribute, allocated by the information quality evaluation function, for a first or a defined further measured value, this first measured value being present at least partially redundantly. To this end, the sensor system has two or more, particularly different measuring paths for providing this measured value, each measuring path comprising at least one sensor element and at least one signal processing function. The current measured values of these measuring paths are validated or compared with one another, respectively, and in this context, in particular, an information item is generated about the reliability with which the first measured value can be currently provided, in dependence on or taking into consideration, respectively, the absolute and/or relative deviations of the current measured values of different measurement paths of the first measured value. With respect to the information item about the reliability of the first measured value, it is considered and understood in a particularly preferred manner to what extent the functional facilities can use the measured values provided or, respectively, which safety requirements are met by the current value of this first measured value. The comparison or the validation of the measured values of the different measuring paths is performed, for example, by means of a table containing defined intervals of measured values.

The information item about the availability is preferably understood to be an attribute, allocated by the information quality evaluation function, for a first or a defined further measured value, this first measured value being present at least partially redundantly. To this end, the sensor system has two or more, particularly different measuring paths for providing this measured value, each measuring path comprising at least one sensor element and at least one signal processing function. The availability is suitably an information item about the length for which a signal or a measured value is still available, that is to say a time information item. To obtain the availability, the case is preferably taken into consideration or evaluated that a first measuring path, particularly the measuring path having the best accuracy and/or reliability would drop, or has just dropped, from the set of measuring paths for the first measured value and for what length of time this first measured value can/could still be provided by means of the other measuring paths and thus the dropout of the first measuring path can be adequately compensated for, taking into consideration a defined requirement for minimum accuracy and a defined requirement for minimum reliability.

It is preferred that the information quality evaluation function allocates to each measured variable, particularly to each measured value of a measured variable, one or more or all of the following information items, particularly as defined variable or parameter: an accuracy information item and/or a reliability information item and/or an availability information item. In this context, this at least one additional information item or, respectively, this at least one additional parameter is transported with the measured variable or each measured value of a measured variable to at least one of the functional facilities.

It is appropriate that the signal processing facility is constructed in such a manner that it additionally comprises a calibration function by means of which the calibration of a sensor element and/or its signal processing is or can be performed or started or influenced.

The signal processing facility comprises preferably one or more programs which are processed by at least one microprocessor or on at least one microprocessor system, respectively.

It is preferred that the interface facility is constructed as a bus and/or as an interface program which supplies the functional facilities with information in a defined manner and, in particular, provides for a bidirectional information exchange in a defined form. In this context, the interface facility is particularly preferably designed as transport layer of a communication protocol, especially preferably in accordance with the OSI "open systems interconnection reference model" layer model.

The signal processing facility is preferably designed in such a manner that it provides or can provide at least one derived measured variable and one information item about the reliability and/or the accuracy and/or availability of this derived measured variable to each functional facility.

It is appropriate that the sensor system exhibits at least one rate-of-rotation sensor, at least one acceleration sensor, one steering angle sensor and at least one, particularly four wheel speed sensors as sensor elements, and especially additionally at least one chassis level sensor and/or at least one environmental sensor and/or at least one position sensor in the form of a satellite navigation system and/or at least one optical speed over ground sensor which detects the roadway optically and determines from this a vehicle speed.

Particularly additionally or alternatively preferably, the sensor system comprises sensor elements which detect environmental data or environmental information of a motor vehicle such as, for example, distances from other objects, vehicles and/or information for the detection of patterns of objects and/or the sensor elements are designed in such a manner that they detect, for example, temperature, external moisture or rain and/or variables of motor management or of the driving system and of the driving power transmission.

It is preferred that the signal processing facility is constructed in such a manner that, on detection of a faulty or non-available primary measured variable or derived measured variable, it provides a redundant primary measured variable or derived measured variable as replacement signal and/or replacement information for at least one functional facility.

The sensor elements and the signal processing facility and particularly additionally the interface facility are preferably constructed and connected to one another in such a manner that at least the primary measured variables and the derived measured variables are provided to the functional facilities in defined time intervals and/or with defined minimum response times. For this purpose, at least the signal processing facility comprises in a particularly preferred manner a real-time-capable microprocessor system having a real-time-capable operating system or a real-time-capable program structure.

It is preferred that at least two sensor elements of a group of sensor elements are connected directly to one another and only a first one of these sensor elements is connected to the signal processing facility, wherein the first sensor element is constructed as master sensor element in the communication with the at least one further sensor element, as slave sensor element, of this group of sensor elements. In this context, the group of sensor elements is constructed, in particular, in such a manner, particularly preferably the master sensor element, that at least one primary measured variable is already compared with at least one derived measured variable of the same type and/or redundant primary measured variables are compared with one another, wherein these measured variables are provided overall by a number of sensor elements, wherein the result of this at least one comparison of measured variables and/or at least one primary measured variable validated in this manner and/or derived measured variable are provided to the signal processing facility.

Alternatively preferably a number, particularly all, of the sensor elements in each case comprise their own signal processing circuit and these sensor elements are connected to one another and form a network of sensor elements, wherein the sensor elements of this network exchange at least measured variables and/or derived measured variables at least partially with one another and these sensor elements are constructed in such a manner that they at least validate at least measured variables and/or derived measured variables, wherein the network of sensor elements is connected to the signal processing facility and wherein the measured variables and derived measured variables of the sensor elements of the network of sensor elements are transported at least partially to the signal processing facility, particularly preferably like at least one information item resulting from a validation.

The signal processing facility comprises suitably only a single microprocessor or microprocessor core, respectively, and the signal processing functions are only processed by a single microprocessor or microprocessor core, respectively. This is advantageous and possible especially when at least one group of sensor elements and/or at least one network of sensor elements performs already at least one validation of measured variables and/or derived measured variables itself as a result of which a redundant validation can also be ensured with only one microprocessor or microprocessor core, respectively, in the signal processing facility.

The sensor system or the signal processing facility is preferably also designated as sensor node or vehicle sensor node.

A derived measured variable or its measurement signal, respectively, is preferably designated as observable. Alternatively, an observable is preferably understood to be a primary measured variable or a derived measured variable, that is to say, an observable can be especially both a derived measured variable and a primary measured variable.

A derived measured variable is preferably understood to be a measured variable which is determined by calculation and/or transformation from another measured variable, especially associated with the former or dependent on the former.

A measured variable suitably comprises in each case a number of measured values.

The sensor elements of a group of sensor elements preferably measure the same physical variables. The master sensor element then compares its measured value with the measured value of the at least one slave sensor element.

As an alternative, the sensor elements of a group of sensor elements preferably measure different physical variables. The master sensor element then compares its measured value with the at least one measured value of the at least one slave sensor element in that its own measured value is derived from these measured values by means of models.

In this context, the following variants are preferred for monitoring within a group of sensor elements: Instantaneous values are compared with one another. In the case of a greater deviation than a threshold value, an error is signaled,
or sliding averages are compared over a certain period of time. In the case of a greater deviation than a threshold value, an error is signaled,
or the, especially sliding, average of the deviation is formed. If this average exceeds a threshold, an error is reported.

The interface facility and/or the sensor elements of a group of sensor elements or of a network of sensor elements preferably exhibit for the purpose of filtering at least one low-pass filter and/or at least one median filter and/or at least one frequency transformation facility.

In particular, the sensor system according to the invention has at least one or, depending on the construction proposed, several or all of the following advantages:

A transparent, structured architecture. By introducing the sensor system or a sensor node, respectively, the E-E architecture becomes more structured and clearer with regard to the interfaces. This standardization in the form of the sensor system means less development expenditure for new functions. Moreover, possible errors due to unclear signal flows and signal delay times are reduced.

The elimination of superfluous redundancies. Whereas in the prior art, the sensors or sensor elements, respectively, are primarily allocated in each case to functions or individual functional facilities, the signals can also be reached primarily for these functions. Other functions, however, may be cut off from these sensor signals so that they require additional sensors for the same measuring task. This is no longer necessary in the sensor system according to the invention.

Improved accuracy: due to the fusion of a number of sensor signals, the possibility exists to compare the redundant observables or derived measured variables, which may have been derived from the sensor signals, with one another. From this, a more accurate measurement information item can be derived in the individual case.

A higher fail-safe level or improved error management: from the comparison of observables measured and calculated in different ways, failures of individual sensors can be detected more rapidly.

Greater availability: also due to the redundant determination of observables, the sensor information can be provided for longer to the vehicle functions or functional facilities in the case of the failure of a sensor.

The invention additionally relates to a method for sensor signal processing by means of the sensor system according to the invention, and to the use of the sensor system in motor vehicles.

In addition, the invention relates to a computer program product which comprises the programs of the sensor system.

BRIEF DESCRIPTION OF THE DRAWINGS

The invention is best understood from the following detailed description when read in connection with the accompanying drawing. Included in the drawings are the following figures.

DETAILED DESCRIPTION OF THE INVENTION

Figure 1:
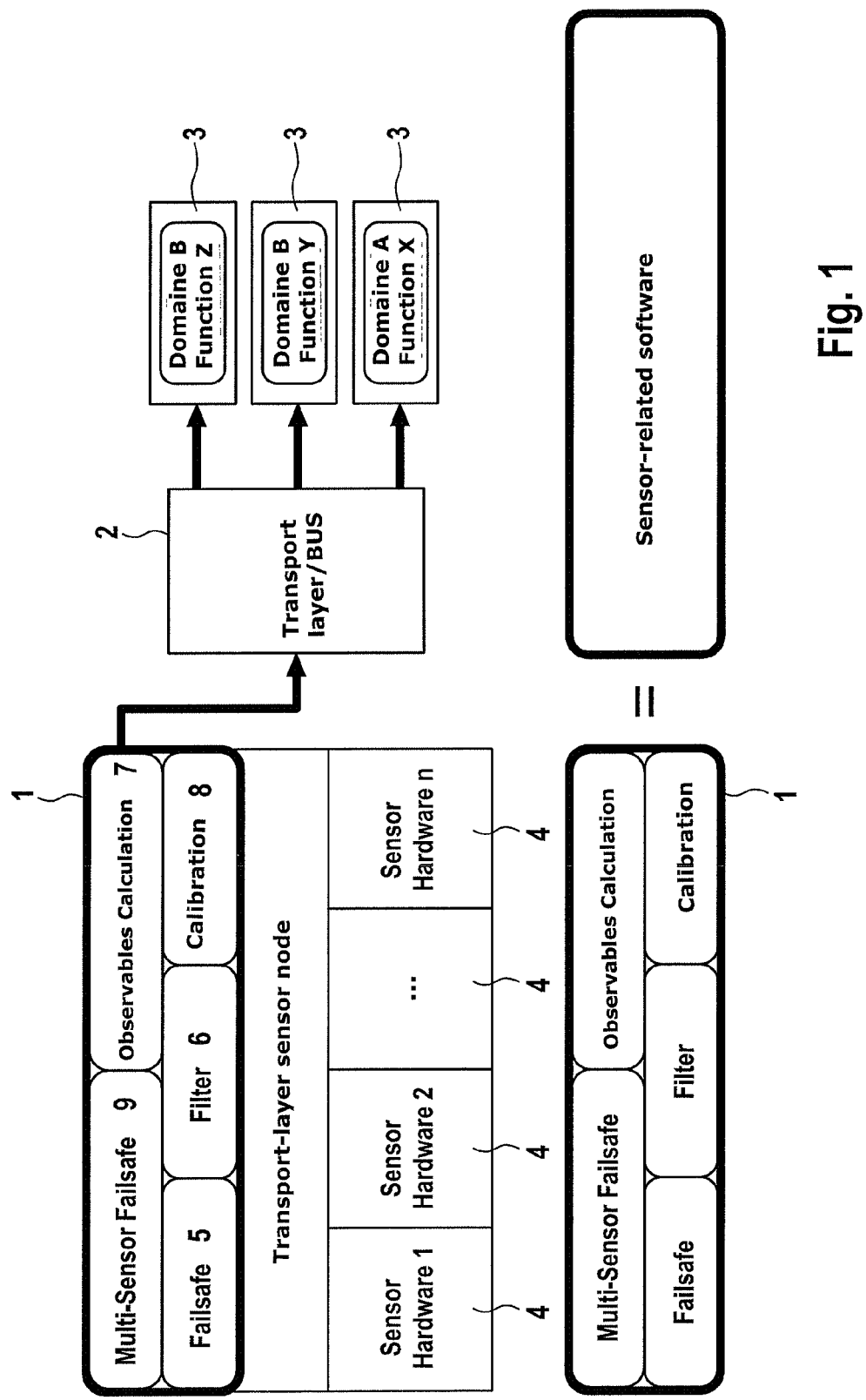
FIG. 1 shows an exemplary embodiment of a sensor system according to the invention.

FIG. 1 shows an exemplary sensor system. In this system, the sensor elements or sensors 4, respectively, are linked bundled with respect to their signal processing and interfaces and tied into the sensor system. The sensor system exhibits as sensor elements 4 "sensor hardware 1 to n", for example, a rate-of-rotation sensor, an acceleration sensor, a steering angle sensor, four wheel speed sensors, a chassis level sensor and a position sensor of a satellite navigation system (global navigation satellite system). The sensor elements 4 are connected to the interface facility 1 by means of a defined interface "transport layer sensor node", wherein this defined interface "transport layer sensor node" is constructed jointly, for example at least with respect to the transmission of information, or satisfies common interface definitions and wherein the physical construction of this interface can be designed separately for each sensor element 4 or for groups of sensor elements or within the framework of a network. The sensor elements 4 themselves are arranged here, for example, distributed in a motor vehicle but selected within the sensor system in such a manner that they provide information for at least one defined group of functional facilities, for example driving dynamics control functional facilities.

The interface facility 1 comprises a number of signal processing functions constructed, for example, as programs: a fault management function "failsafe" 5, a fault management function with respect to a number of sensor elements 4 or a group of sensor elements 4—"multi-sensor failsafe" 9, a filtering function "filter" 6 of sensor signals or sensor information items, a calibration function "calibration" 8, with which the calibration of a sensor element and/or its signal processing function can be effected and a calculation and/or provision one or more derived measured variables "observables calculation" 7, wherein these derived measured variables or observables can be generated, for example, from different sensor signals or by means of defined modeling formations or by means of defined calculations. Thus, for example, the rotational speed around the vertical axis of the vehicle can be derived from the signals of the wheel speed sensors and also from the yaw rate sensor. Thus, these observables and primary measured variables provide redundant information about the vehicle/environment which can be compared with one another in the signal processing facility or in the sensor node or can support one another if there is a disturbance on one signal path whilst the other one is still operable. From the comparison of the observables calculated in different ways conclusions can be drawn on the reliability and accuracy of the observables so that faulty measurements can be filtered out. The sensor node or the signal processing facility, respectively, qualifies the accuracy of the observables and provides the observable, together with an information item on accuracy, via an interface facility 2, for example the transport layer/the bus of the vehicle as sensor information to various functional facilities 3, for example to functional facilities 3 for active and passive safety, of comfort systems and of multimedia applications.

Figure 2:
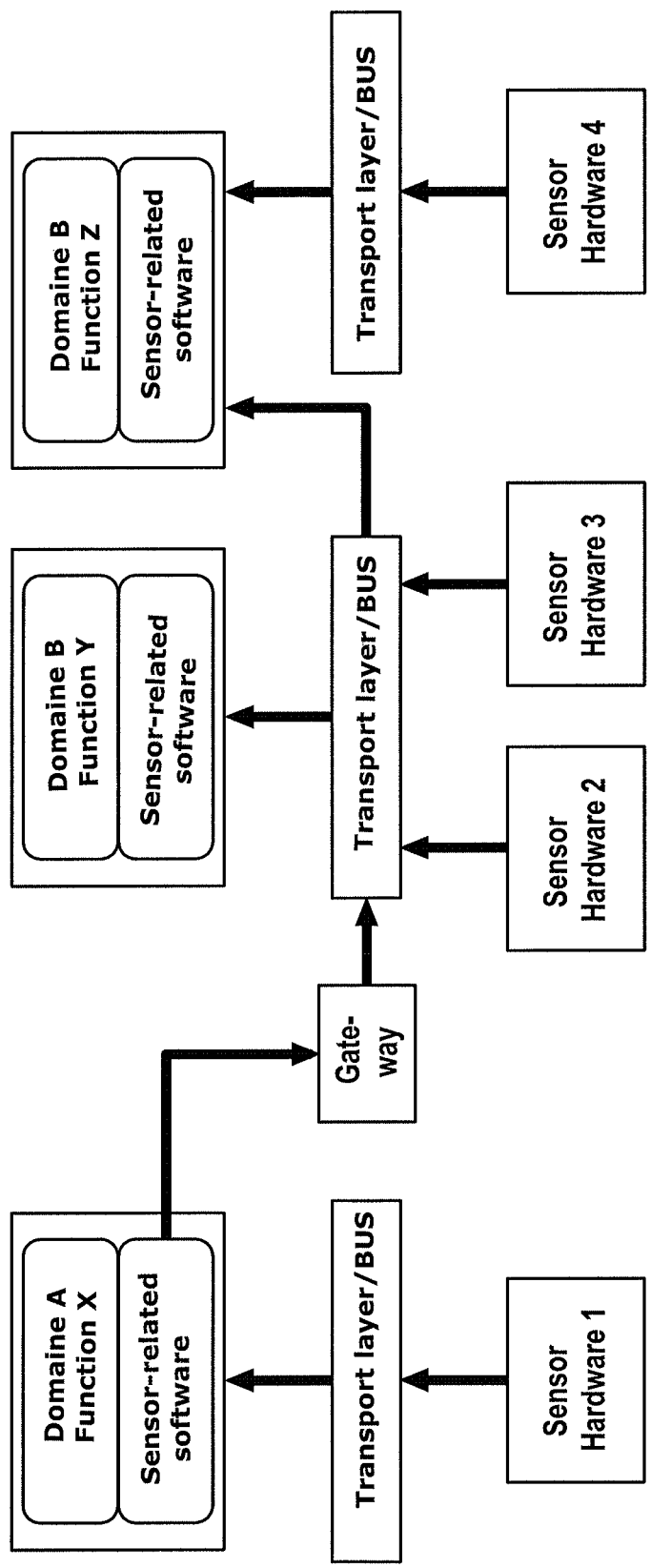
FIG. 2 shows an exemplary sensor system according to the prior art.

In present-day vehicle architectures known from the prior art, sensors or sensor elements are allocated to primary functions but sensor signals can also be used by secondary functions in that they are either forwarded via gateways, which is mainly the case with safety-related primary functions, or by being directly accessible. An example according to the prior art is illustrated by means of FIG. 2.

The invention claimed is:

1. A sensor system comprising:
a number of sensor elements which are constructed in such a manner that they detect at least partially different primary measured variables and utilize at least partially different measuring principles,
a signal processing facility,
an interface facility, and
a number of functional facilities,
wherein the sensor elements are connected to the signal processing facility which is designed in such a manner that it comprises at least in each case one of the following signal processing functions for at least one of the sensor elements and/or its output signals,
a fault management function,
a filtering function, and
a calculation and/or provision of a derived measured variable, wherein at least one measured variable is derived from at least one primary measured variable of one or more sensor elements, and
wherein all functional facilities are connected to the signal processing facility via the interface facility and the signal processing facility provides the signal processing functions to the functional facilities.

2. The sensor system as claimed in claim 1, wherein it is constructed as a part of a motor vehicle control system and at least one of the functional facilities is constructed as at least one of a driving dynamics control function, a motor vehicle safety function, and motor vehicle passenger comfort function, wherein this at least one function is designed at least partially as a program.

3. The sensor system as claimed in claim 1, wherein all sensor elements of this sensor system are connected jointly and/or in each case to the signal processing facility.

4. The sensor system as claimed in claim 1, wherein the signal processing facility is constructed such that it additionally exhibits an information quality evaluation function which provides an information item about at least one of the reliability, the accuracy, and the availability of one or more or each individual one of the derived and/or primary measured variables.

5. The sensor system as claimed in claim 1, wherein the signal processing facility is constructed such that it additionally comprises a calibration function by which the calibration of a sensor element and/or its signal processing is performed or started or influenced.

6. The sensor system as claimed in claim 1, wherein the signal processing facility comprises one or more programs which are processed on at least one microprocessor.

7. The sensor system as claimed in claim 1, wherein the interface facility is constructed as a bus and/or as an interface program which supplies the functional facilities with information in a defined manner and provides for bidirectional information exchange in a defined form.

8. The sensor system as claimed in claim 1, wherein the sensor system comprises at least one rate-of-rotation sensor, at least one acceleration sensor, one steering angle sensor and at least one wheel speed sensor as the sensor elements and additionally i) at least one of a chassis level sensor, ii) at least one environmental sensor iii) at least one optical speed sensor, and iv) at least one satellite navigation system for the detection of position.

9. The sensor system as claimed in claim 1, wherein the signal processing facility is constructed such that, on detection of a faulty or non-available primary measured variable or derived measured variable, it provides a redundant primary measured variable or derived measured variable as a replacement signal and/or replacement information for at least one functional facility.

10. The sensor system as claimed in claim 1, wherein the sensor elements and the signal processing facility and the interface facility are constructed and connected to one another such that at least the primary measured variables and the derived measured variables are provided to the functional facilities in defined time intervals and/or with defined minimum response times.

11. The sensor system as claimed in claim 1, wherein at least two sensor elements of a group of sensor elements are connected directly to one another and only a first one of these sensor elements is connected to the signal processing facility, wherein the first sensor element is constructed as master sensor element in the communication with the at least one further sensor element, as slave sensor element, of this group of sensor elements.

12. The sensor system as claimed in claim 11, wherein the group of sensor elements, especially the master sensor element, is constructed such that at least one primary measured variable is already compared with at least one derived measured variable of the same type and/or redundant primary measured variables are compared with one another, wherein these measured variables are provided overall by a number of sensor elements, wherein the result of this at least one comparison of measured variables and/or at least one primary measured variable validated in this manner and/or derived measured variable are provided to the signal processing facility.

13. The sensor system as claimed in claim 11, wherein the signal processing facility comprises only a single microprocessor and the signal processing functions are only processed by a single microprocessor.

14. The sensor system as claimed in claim 1, wherein a number of the sensor elements in each case comprise their own signal processing circuit and these sensor elements are connected to one another and form a network of sensor elements and the sensor elements of this network exchange at least measured variables and/or derived measured variables at least partially with one another and in that these sensor elements are constructed in such a manner that they at least validate at least measured variables and/or derived measured variables, wherein the network of sensor elements is connected to the signal processing facility and wherein the measured variables and derived measured variables of the sensor elements of the network of sensor elements are transported at least partially to the signal processing facility.

* * * * *